March 31, 1942.   F. C. ALBRIGHT   2,277,896
LANDING GEAR
Filed Aug. 23, 1939   2 Sheets-Sheet 2
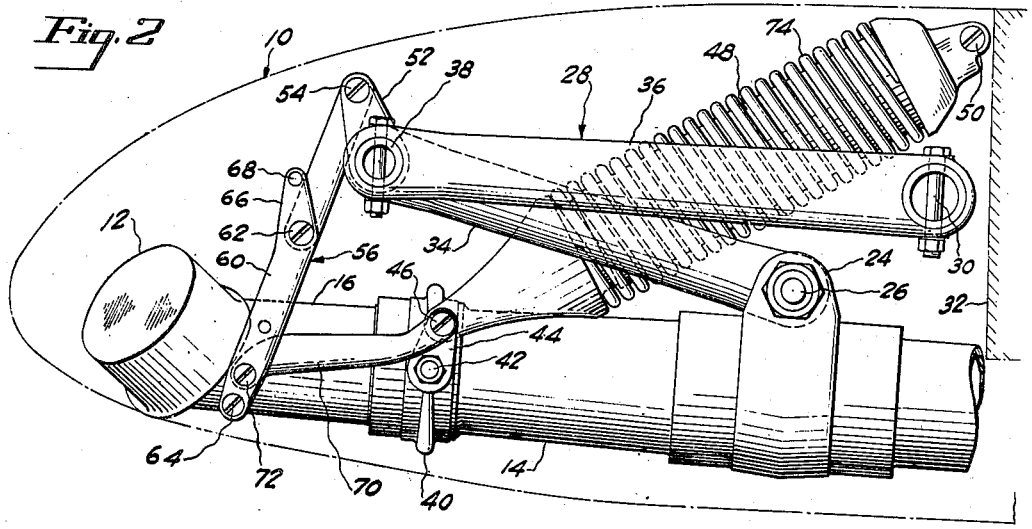
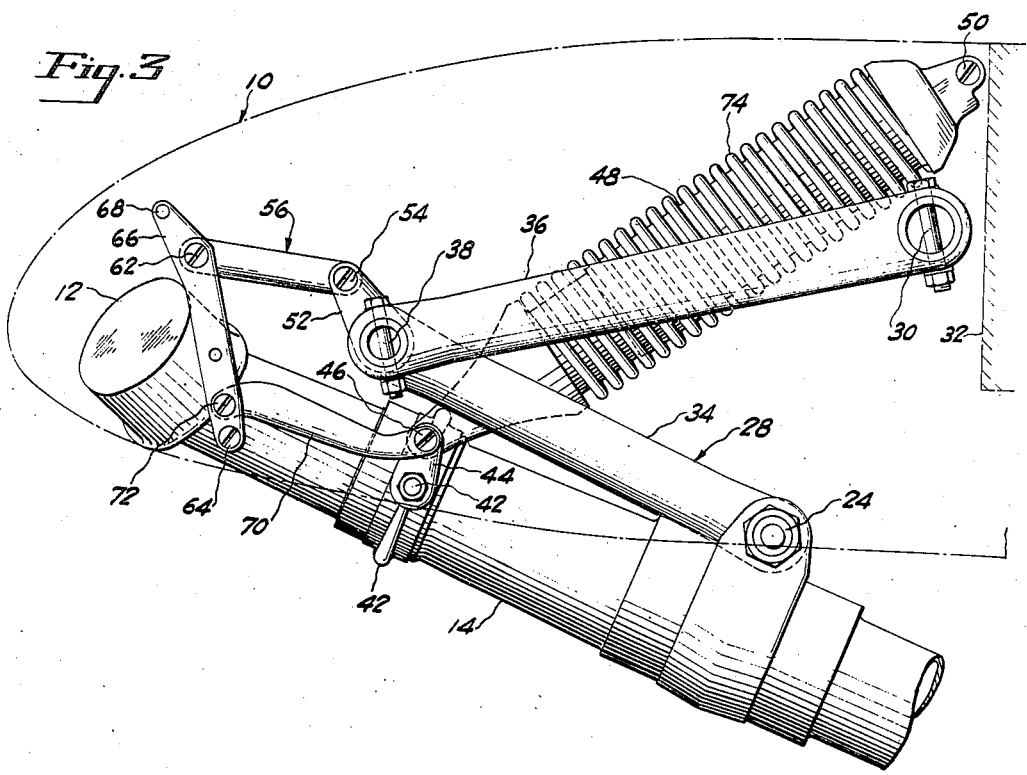
INVENTOR
Frank C. Albright
BY Harris G. Luther
ATTORNEY Patented Mar. 31, 1942

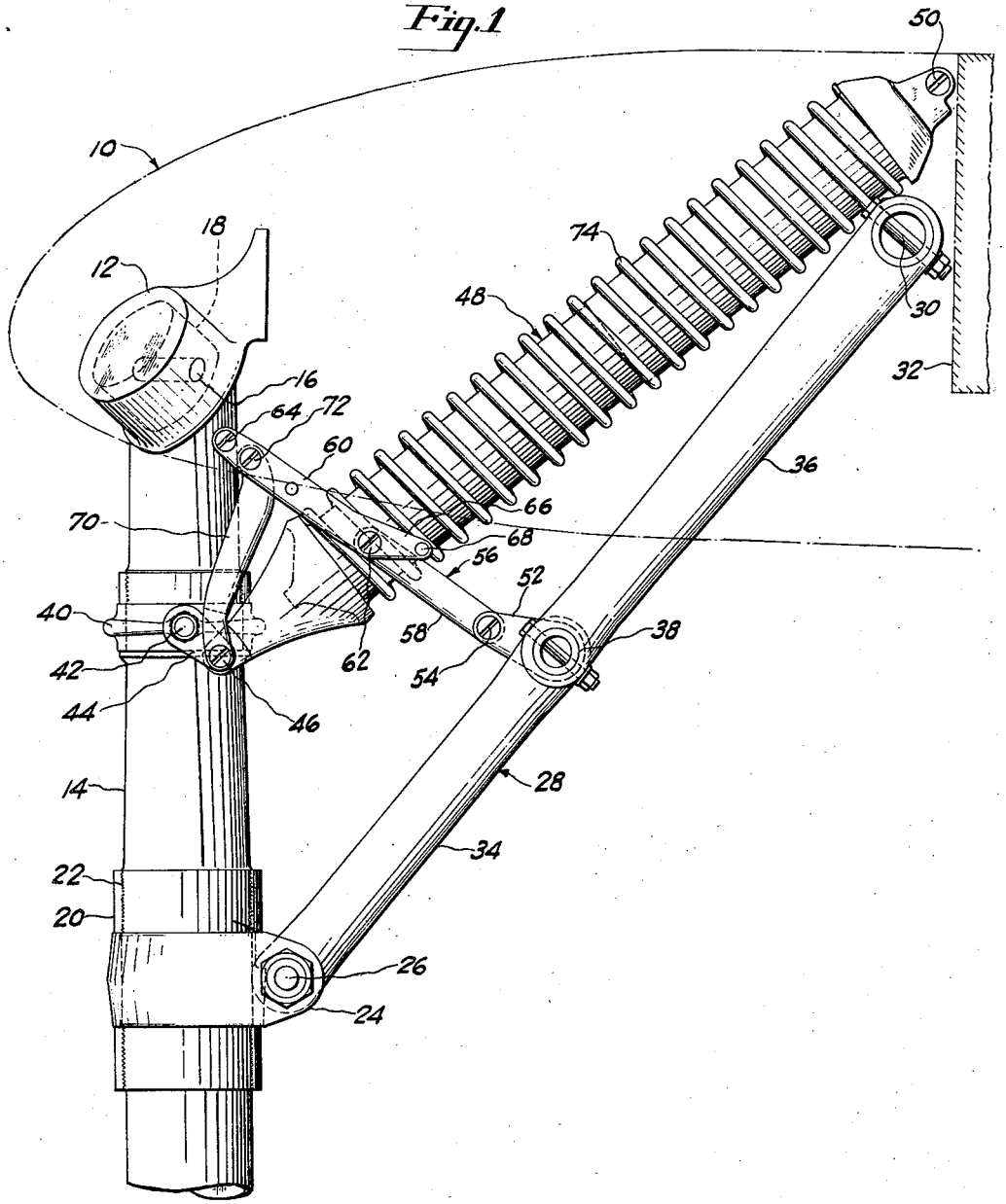

2,277,896

UNITED STATES PATENT OFFICE 2,277,896

LANDING GEAR

Frank C. Albright, Stratford, Conn., assignor to United Aircraft Corporation, East Hartford, Conn., a corporation of Delaware Application August 23, 1939, Serial No. 291,541

15 Claims. (Cl. 244—102)

This invention relates to improvements in aircraft landing gears and has for an object the provision of an improved retracting and locking means for a retractable landing gear.

A further object resides in the provision, in combination with a retractable landing gear of retracting means operative to lock the landing gear in both its retracted and extended positions.

A still further object resides in the provision of an improved landing gear retracting means including locking means for both landing gear positions in which the locking means is automatically released upon a change in the direction of force applied by the retracting means.

An additional object resides in the provision, in an improved landing gear retracting means of the character specified including means for automatically locking the landing gear in either its up or its down position, of resilient means capable of applying sufficient force in a direction to release the lock when holding the landing gear in its retracted position in the event the retracting means becomes inoperative.

Other objects and advantages will be more particularly pointed out hereinafter or will become apparent as the description proceeds.

In the accompanying drawings, in which like reference numerals are used to designate similar parts throughout, there is illustrated a suitable mechanical embodiment for the purpose of disclosing the invention. The drawings, however, are not to be taken as limiting or restricting the scope of the invention since it will be apparent to those skilled in the art that various changes may be made in the illustrated construction without in any way exceeding the scope of the invention.

In the drawings, Fig. 1 is a side view of a fragmentary portion of the landing gear showing the landing gear in the down or extended position.

Fig. 2 is a view similar to Fig. 1 showing the landing gear in the up or retracted position, and Fig. 3 is a view similar to Figs. 1 and 2 showing the landing gear at an intermediate position between its up and down positions.

Referring to the drawings in detail, the numeral 10 generally indicates an airplane wing, the outline of which is shown by the broken line in the drawings. The leading edge or forward portion of the wing is provided with a suitable truss for supporting the upper landing gear bearing 12. The landing gear wheel, not illustrated, is carried upon the lower end of a telescopic strut member the upper tubular portion of which is shown and indicated by the numeral 14. The upper end of this strut member has a transverse pivotal connection 16 with a movable bearing member 18. The bearing cup 12 is skewed upwardly and outwardly from the axis of the strut 14, when the strut is in the extended position shown, so that, as the strut is swung backwardly toward its retracted position, it will be simultaneously rotated through an angle of approximately 90 degrees to change the position of the landing wheel from a position in which it is substantially parallel to a plane passing through a wing chord axis when in its downward position to a position in which it is substantially parallel to the undersurface of the wing when in its retracted position. Intermediate its length the strut 14 is provided with a bushing or sleeve 20 rotatable with respect to the strut but held against substantial longitudinal movement relative thereto by suitable means such as the interengaging screw threads 22. This sleeve has an apertured offset 24 supporting a pivot bolt 26 from which extends a two part strut member, generally indicated at 28, to a pivotal connection 30 secured to the main wing spar 32, the strut comprising two parts 34 and 36 connected at their adjoining ends by a pivotal connection 38. For a more detailed explanation of this construction reference may be had to United States Patent Number 2,116,395, issued May 3, 1938, to Knut Henrichsen for Retractile landing gear.

A second collar 40 is mounted on the strut 14 between the collar 20 and the bearing 18 and carries a trunnion 42 upon which is supported one end of a short lever member 44 the outer end of which is attached by a pivotal connection 46 with the movable or free end of a hydraulic motor in the form of a telescopic double acting hydraulic strut, generally indicated at 48, the opposite end of which is attached by the pivotal connection 50 to the spar 32. With this arrangement it will be apparent that the strut 48 when contracted will pull on the main strut 14 in a direction to retract the landing gear and when expanded will exert a force on the main strut to extend or lower the landing gear.

The upper portion 36 of the brace 28 is provided with an extension 52 having an apertured end supporting a pivot 54 to which is attached one end of a toggle linkage generally indicated at 56 and including the link members 58 and 60, connected together at their adjoining ends by the pivot connection 62, the member 60 being pivotally connected to a fixed point on the wing structure 10 or fixed bearing cup 12 by the pivotal connection 64. The member 60 is provided with an extension 66 which carries at its end a fixed pin 68 adapted to contact the edge of the member 58 to limit bending of the toggle linkage in one direction. A link member 70 is connected at one end to the pivot pin 46 and at the opposite end, by means of a pivotal connection 72, to the toggle link member 60 at a location near the pivot 64 and between the pivots 64 and 62. A coiled compression spring 74 surrounds the hydraulic motor 48 and is effective to exert a force in a direction tending to expand or lengthen the hydraulic motor.

The operation of the device is substantially as follows.

Assuming that the landing gear is in the down or extended position, as shown in Fig. 1, and that it is desired to retract the same, hydraulic fluid under pressure will be supplied to the strut like motor 48 through an appropriate hydraulic connection to exert a force tending to contract the motor. As the motor 48 contracts it will first swing the arm 44 about the pivot 42 moving the link 70 upwardly to break the lock provided by the over center relation of the toggle 56. As the toggle lock is broken it moves the pivot point 38 upwardly disrupting the straight line relationship of the pivot points 26, 38 and 30 of the brace 28. Further contraction of the motor 48 will then swing the strut 14 rearwardly toward its retracted position the strut being rotated on the angular bearing 18 to bring the landing wheel from its operative extended position to a position in which it is substantially parallel to the wing surface, the strut being permitted to swing rearwardly in a straight line by reason of the inclusion of the transverse pivot connection 16 between the strut and the bearing member 18, particularly shown in the Henrichsen patent referred to above. As the strut is swung rearwardly by the retracting force exerted by the motor 48 the toggle 56 will be brought to its extreme angular or buckled position, at an intermediate position in the movements of the main strut 14 from the extended to the retracted position, as particularly illustrated in Fig. 3. As the landing gear passes through the intermediate position shown in Fig. 3 in the retracting direction the toggle 15 is gradually straightened by the pull of the link 70 as the motor 48 continues to contract so that the toggle is completely straight again when the landing gear is in its full retracted position, as particularly illustrated in Fig. 2. When the various parts are in the relative positions shown in Fig. 2 the members 34 and 36 of brace 28 support the pivot point 54 on the extension 52 against fore and aft movements relative to the fixed point of the landing gear while the straight toggle 56 maintains the intermediate pivot point 38 of the brace members 34 and 36 at a fixed distance from the main strut 14, the brace and toggle thereby constituting a double triangulation support which is completely rigid as long as the parts are in the locked position illustrated in Fig. 2. It is obvious from the geometry of the construction that, in order for the landing gear to be moved downwardly from the retracted position shown in Fig. 2 the point 38 has to move. Therefore, by locking the point 38 by the straightened toggle 56 the landing gear will be rigidly secured in the retracted position.

In order to move the landing gear from the retracted position shown in Fig. 2 to the extended position shown in Fig. 1, hydraulic fluid is supplied to the motor 48 in a direction to expand the motor. Initial expansion of the motor 48 moves the link 70 in a direction to break the locked toggle 56 so that the point 38 may move. After the toggle has been buckled the landing gear may fall to its extended position of its own weight or, in case the air forces reacting against it are too high may be forced to the completely extended position by the continued application of hydraulic fluid to expand the hydraulic motor 48. When the landing gear has been moved to its fully extended position, illustrated in Fig. 1, the toggle 56 is again straightened and in its straightened condition maintains the pivot point 38 of the brace 28 in direct alignment with the end pivot points 26 and 30 of the brace member so that the brace is rigid against compression and maintains the main strut 14 in the extended position illustrated.

In the arrangement illustrated a sufficient hydraulic pressure has to be maintained on the motor 48 to counteract the expansive force of the spring 74 in order to maintain the landing gear in the retracted position. This force is constant and relatively light and does not impose any excessive strain on the hydraulic system. However, if the hydraulic pressure for any reason entirely fails, the spring 74 will exert an expansive force on the motor 48 sufficient to break the toggle 56 and unlock the landing gear when in its retracted position. The landing gear will then fall to its extended position or may be brought to the extended position by abruptly pulling the airplane, upon which the landing gear is mounted, out of a dive, which maneuver will increase the gravitational effect on the landing gear sufficiently to overcome the friction and air forces opposing movement of the landing gear to its fully extended position.

From the above description taken in connection with the accompanying drawings it will be observed that there has been provided an improved landing gear retracting mechanism in which the same members serve to lock the landing gear in both the up and the down positions and in which the lock in either position is automatically broken by the application of power to the retracting and extending motor to move the landing gear from the particular position, and which also includes means for releasing the lock when the landing gear is in its retracted position in the event of a failure of power for the operating motor.

While a particular mechanical embodiment has been hereinabove described and illustrated in the accompanying drawings for the purpose of disclosing the invention, it is to be understood that the invention is not limited to the particular arrangement so illustrated and described but that such changes in the size, shape and arrangements of the various parts may be resorted to as come within the scope of the subjoined claims.

Having now described the invention so that others skilled in the art may clearly understand the same, what it is desired to secure by Letters Patent is as follows:

1. In combination with an airplane landing gear having a main strut swingable about a fixed point at its upper end from an extended to a retracted position, a motor device connected between said strut and a relatively fixed point on said airplane for moving said strut, and a jointed brace member also connected between said strut and a relatively fixed point on said airplane for supporting said strut, means comprising a toggle linkage connected between said brace member and a fixed point on said airplane and having an operative connection with said motor for locking said strut in either its extended or its retracted position, said toggle being operable by a reversal of said motor to release said strut for movement.

2. In combination with a retractable airplane landing gear having a main strut swingable about a pivot at its upper end, a variable length motor for moving said strut, and a two part brace connected at one end to said strut and at the opposite end to a fixed position of said airplane and having a pivotal joint intermediate its length, a toggle linkage pivotally connected at one end to a fixed portion of said airplane and at the opposite end to said brace near said intermediate joint to maintain said intermediate joint in a predetermined position whenever said toggle is straightened to thereby lock said landing gear in position, the various pivot points being so located that said toggle is straightened whenever said landing gear is in its fully extended or fully retracted position.

3. In combination with a retractable airplane landing gear having a main strut swingable about a pivot at its upper end about a fixed pivot secured to said airplane, a variable length motor for moving said strut, and a two part brace connected at one end to said strut and at the opposite end to a fixed portion of said airplane and having a pivotal joint intermediate its length, a toggle linkage pivotally connected at one end to a fixed portion of said airplane and at the opposite end to said brace near said intermediate joint to maintain said intermediate joint in a predetermined position whenever said toggle is straightened to thereby lock said landing gear in position, the various points being so located that said toggle is straightened whenever said landing gear is in its fully extended or fully retracted position, and an operative connection between said toggle and said motor for breaking said toggle to release said landing gear whenever the effort of said motor is reversed to move said landing gear from one locked position to the other.

4. In combination with a retractable airplane landing gear having a main strut swingable about a pivot at its upper end about a fixed point secured to said airplane, a variable length motor pivotally connected at one end to a fixed part of said airplane and at the opposite end to said strut to move said strut about said strut pivot, and a two part brace connected at one end to said strut and at the opposite end to a fixed portion of said airplane and having a pivotal joint intermediate its length, a toggle linkage pivotally connected at one end to a fixed portion of said airplane and at the opposite end to said brace near said intermediate joint to maintain said intermediate joint in a predetermined position whenever said toggle is straightened to thereby lock said landing gear in position, the various pivot points being so located that said toggle is straightened whenever said landing gear is in its fully extended or fully retracted position, and an operative connection between said toggle and said motor for breaking said toggle to release said landing gear whenever the effort of said motor is reversed to move said landing gear from one locked position to the other, said connection comprising, a pivoted link interposed between said opposite end of said motor and said strut, and a link extending from said opposite end of said motor to said toggle.

5. In combination with an airplane having a wing, a retractable airplane landing gear having a main strut swingable at its upper end about a fixed pivot carried by said wing, a variable length motor for moving said strut, and a two part brace pivotally connected at one end to said strut and at the opposite end to a fixed pivot carried by said wing and having a pivotal joint intermediate its length, a toggle linkage pivotally connected at one end to a fixed portion of said wing and at the opposite end to said brace near said intermediate joint to maintain said intermediate joint in a predetermined position whenever said toggle is straightened to thereby lock said landing gear in position, the various pivot points being so located that said toggle is straight whenever said landing gear is in its fully extended or fully retracted position, said toggle having an intermediate joint provided with an elbow stop to prevent movements of said joint in one direction past a straight line relationship with the end pivots of said toggle.

6. In combination with a retractable landing gear comprising, a main strut swingable about a relatively fixed point at its upper end, a jointed brace having a relatively fixed pivot spaced from said strut pivot, a pivotal connection with said strut also spaced from said strut pivot, and an intermediate pivotal joint, and a variable length motor having a relatively fixed pivotal support spaced from said strut pivot and a pivotal connection with said strut, locking means for said landing gear comprising, a toggle linkage having a relatively fixed pivotal connection near said strut pivot, a pivotal connection with said brace near said intermediate joints and an intermediate hinge joint provided with a stop operative when said toggle reaches a substantially straight condition, and means for actuating said toggle comprising, a short pivoted link interposed between said main strut and the adjacent end of said motor, and a pivoted link extending from said end of said motor to said toggle.

7. In combination with a retractable landing gear attached to an airplane and having a movable main strut pivotally connected at one end to said airplane, a foldable brace disposed at an angle to said main strut when extended and pivotally connected to said main strut and said airplane, and a motor for moving said main strut, means for locking said main strut in its extended or its retracted position comprising, a foldable toggle interconnected between said airplane and said brace, so arranged and proportioned that while said toggle and said brace fold and straighten together said toggle straightens again when said brace folds, said toggle when straightened with said landing gear extended maintaining the pivot points of said brace in a straight line and when straightened with said landing gear retracted constituting one leg of a truss supporting said main strut in retracted position.

8. In combination with a retractable landing gear comprising, a main strut swingable about a relatively fixed pivot at its upper end, a jointed brace having a relatively fixed pivot spaced from said strut pivot, a pivotal connection with said strut also spaced from said strut pivot, and an intermediate pivotal joint, and a motor having a relatively fixed pivotal support spaced from said strut pivot and a pivotal connection with said strut, locking means for said landing gear comprising, a toggle linkage having a relatively fixed pivotal connection adjacent to said main strut pivot and a pivotal connection with said brace adjacent to said intermediate hinge joint, said toggle when straightened with the landing gear extended maintaining the pivot points of said brace in a straight line and when straightened with said landing gear retracted constituting one leg of a triangulated supporting truss including said toggle, said brace, the portion of said main strut between said relatively fixed strut pivot and said pivotal connection with said brace.

9. In combination with an airplane having a wing, a retractable landing gear having a movable main strut, a foldable brace disposed at an angle to said main strut, and a motor for moving said main strut, means for locking said main strut in its extended or retracted position comprising, a foldable toggle interposed between said wing and said brace, so arranged and proportioned that while said toggle and said brace open and fold together said toggle straightens again when said brace folds, said toggle when straightened with the landing gear extended maintaining the pivot points of said brace in a straight line and when straightened with said landing gear retracted constituting one leg of a triangulated supporting truss, and an operative connection between said motor and said toggle to break the straight condition of said toggle whenever the effort of said motor is reversed to move the landing gear from one locked position to the other.

10. In combination with a retractable landing gear associated with an airplane part such as a wing and having a movable main strut, a foldable brace disposed at an angle to said main strut, and a motor for moving said main strut, means for locking said main strut in its extended or retracted position comprising, a foldable toggle interposed between said wing and said brace, so arranged and proportioned that while said toggle and said brace move together said toggle folds and opens again when said brace moves between open and folded positions, said toggle when opened with the landing gear extended maintaining the pivot points of said brace in a straight line and when open with said landing gear retracted constituting one leg of a triangulated supporting truss, and an operating connection between said motor and said toggle to assist in opening said toggle to its locking condition when the motor moves said strut to its extended or retracted position and to break the open condition of said toggle whenever the effort of said motor is reversed to move the landing gear from its extended or retracted position.

11. In combination with an airplane having a wing and a retractable landing gear having a movable main strut pivotally secured at one end to said wing, a foldable brace disposed at an angle to said main strut and pivotally secured to said main strut and said wing, and a motor for moving said main strut, means for locking said main strut in its extended or retracted position comprising, a foldable toggle interposed between said wing and said brace, so arranged and proportioned that while said toggle and said brace move together said toggle folds and opens again whenever said brace opens or folds, an operative connection between said motor and said toggle to break the open condition of said toggle whenever the effort of said motor is reversed to move the landing gear from one locked position to the other, and a spring exerting a force in a direction to break the open condition of said toggle when said landing gear is in its retracted position to release said landing gear in the event of failure of power for said motor.

12. In combination with an airplane and a retractable landing gear having a movable strut pivotally connected at its upper end to a fixed portion of said airplane, a two part foldable brace pivotally connected at one end to said airplane at a point spaced from said strut pivot and pivotally connected at the opposite end to said strut, and a motor for moving said strut about said strut pivot, a toggle linkage connected between a relatively fixed point on said airplane and said brace constituting when straight one leg of a rigid triangle including as other legs the strut attached portion of said brace and the portion of said strut between said strut pivot and the pivotal connection of said brace with said strut, the airplane attached portion of said brace being connected to the apex of said triangle opposite said strut to rigidly support said strut whenever said toggle is straight, and means for straightening said toggle in both the fully extended and fully retracted positions of said landing gear.

13. In combination with an airplane landing gear having a main strut swingable from an extended to a retracted position, a foldable strut secured at one end to said main strut for bracing said main strut and an expansible motor device having one portion connected with said main strut independent of said foldable strut for moving said main strut between extended and retracted positions and locking means operatively connected with said foldable strut and having an operative connection with said motor device to lock said landing gear upon movement of said landing gear by said motor to either of its limiting positions and actuated by a reversal of said motor to release said landing gear for movement by said motor.

14. In combination with a retractable landing gear associated with an airplane part such as an airplane wing and having a movable main strut, a foldable brace connected at one end with said main strut and the other with said airplane part and disposed at an angle to said main strut, an extensible and retractable motor driven device for moving said main strut and means for locking said main strut in its extended or retracted position comprising, a foldable toggle connecting said airplane part and said brace, so arranged and proportioned that when said toggle is in its straightened position it holds said brace against movement and thus locks said main strut and means connecting said motor driven device and said toggle for straightening said toggle with the main strut in either its extended or retracted position.

15. In combination with a retractable landing gear having an extended position and a retracted position, mechanism for moving said landing gear between said positions, means for locking said landing gear in each position comprising a single toggle linkage connected with both said landing gear and said moving mechanism and having two straightened positions, one straightened position holding the landing gear extended and the other straightened position holding the landing gear retracted and means connecting said toggle and said moving mechanism constructed and arranged so that said moving mechanism will force said toggle into straightened position when it has retracted said landing gear and will force said toggle into straightened position when it has extended said landing gear.

FRANK C. ALBRIGHT.